United States Patent
Kuwabara et al.

(10) Patent No.: US 10,193,178 B2
(45) Date of Patent: Jan. 29, 2019

(54) REDOX FLOW BATTERY FRAME BODY, REDOX FLOW BATTERY, AND CELL STACK

(71) Applicant: Sumitomo Electric Industries, Ltd., Osaka-shi (JP)

(72) Inventors: Masahiro Kuwabara, Osaka (JP); Haruhisa Toyoda, Osaka (JP); Takashi Kanno, Osaka (JP); Takefumi Ito, Osaka (JP); Hideyuki Yamaguchi, Osaka (JP); Hayato Fujita, Osaka (JP); Kousuke Shiraki, Osaka (JP); Kiyoaki Hayashi, Osaka (JP)

(73) Assignee: Sumitomo Electric Inductries, Ltd., Osaka-shi (JP)

( * ) Notice: Subject to any disclaimer, the term of this patent is extended or adjusted under 35 U.S.C. 154(b) by 0 days.

(21) Appl. No.: 15/570,066

(22) PCT Filed: Feb. 28, 2017

(86) PCT No.: PCT/JP2017/007797
§ 371 (c)(1),
(2) Date: Oct. 27, 2017

(87) PCT Pub. No.: WO2017/169463
PCT Pub. Date: Oct. 5, 2017

(65) Prior Publication Data
US 2018/0108930 A1 Apr. 19, 2018

(30) Foreign Application Priority Data
Mar. 29, 2016 (JP) .................. 2016-066323

(51) Int. Cl.
*H01M 8/18* (2006.01)
*H01M 8/2483* (2016.01)
(Continued)

(52) U.S. Cl.
CPC ......... *H01M 8/188* (2013.01); *H01M 8/0247* (2013.01); *H01M 8/242* (2013.01);
(Continued)

(58) Field of Classification Search
CPC ........................... H01M 8/188; H01M 8/2483
See application file for complete search history.

(56) References Cited

U.S. PATENT DOCUMENTS

| | | | |
|---|---|---|---|
| 9,269,982 B2 * | 2/2016 | Sahu ................... | H01M 8/0284 |
| 2004/0170893 A1 * | 9/2004 | Nakaishi ............. | H01M 8/0273 |
| | | | 429/185 |

(Continued)

FOREIGN PATENT DOCUMENTS

| | | |
|---|---|---|
| CN | 102969517 A | 3/2013 |
| JP | 2002-367658 A | 12/2002 |

(Continued)

*Primary Examiner* — Muhammad S Siddiquee
(74) *Attorney, Agent, or Firm* — Venable LLP; Michael A. Sartori; Laura G. Remus (57) ABSTRACT

A frame body for a redox flow battery is provided with a window. The expressions A>C, B>D, and (B/A)≥0.2 are satisfied, where A represents the length of a long side of a rectangle that envelops the window, B represents the width of a horizontal frame corresponding to the long side, C represents the length of a short side of the rectangle, and D represents the width of a vertical frame corresponding to the short side.

7 Claims, 3 Drawing Sheets

(51) Int. Cl.
*H01M 8/242* (2016.01)
*H01M 8/2455* (2016.01)
*H01M 8/0247* (2016.01)

(52) U.S. Cl.
CPC ....... *H01M 8/2455* (2013.01); *H01M 8/2483* (2016.02); *Y02E 60/528* (2013.01)

(56) References Cited

U.S. PATENT DOCUMENTS

2014/0255815 A1* 9/2014 Yano ................ H01M 8/188
429/455
2016/0006046 A1* 1/2016 Bucsich ............. H01M 8/188
429/463

FOREIGN PATENT DOCUMENTS

| JP | 2002-367659 A | 12/2002 |
| JP | 2003-504811 A | 2/2003 |
| JP | 2017-010791 A | 1/2017 |
| WO | 2001/003224 A1 | 1/2001 |

\* cited by examiner

REDOX FLOW BATTERY FRAME BODY, REDOX FLOW BATTERY, AND CELL STACK

TECHNICAL FIELD

The present invention relates to a redox flow battery which is one of storage batteries, a frame body used for a redox flow battery, and a cell stack.

The present application is based upon and claims the benefit of priority from Japanese Patent Application No. 2016-066323, filed Mar. 29, 2016, the entire contents of which are incorporated herein by reference.

BACKGROUND ART

One of storage batteries is a redox flow battery (hereinafter, may be referred to as an "RF battery") in which a battery reaction is conducted by supplying electrolytes to electrodes. The RF battery has characteristics such as (1) ease of output increase and capacity increase to a megawatt (MW) level, (2) a long life, (3) capability of accurately monitoring the state of charge (SOC) of the battery, and (4) high design freedom such that battery output and battery capacity can be independently designed, and is expected to be a suitable storage battery for stabilization of power systems.

An RF battery includes, as a main component, a battery cell including a positive electrode to which a positive electrode electrolyte is supplied, a negative electrode to which a negative electrode electrolyte is supplied, and a membrane disposed between the two electrodes. A battery cell is typically formed by using a cell frame including a bipolar plate on which electrodes are disposed and a frame body which is provided on the outer periphery of the bipolar plate. A large-capacity RF battery uses a cell stack including mainly a layered body formed by stacking a cell frame, an electrode of one polarity, a membrane, and an electrode of the other polarity in this order repeatedly a plurality of times.

The layered body is sandwiched between a positive electrode supply/drainage plate and a negative electrode supply/drainage plate for supplying unreacted electrolytes to their respective electrodes and discharging electrolytes used in battery reactions from their respective electrodes, and further sandwiched between a pair of end plates. The end plates are fastened with long bolts and nuts. The stacked state is maintained by the fastening force acting in the stacking direction. Furthermore, the fastening force enables a sealing member disposed between two adjacent frame bodies to maintain the space between the frame bodies in a fluid-tight manner so as to prevent leakage of electrolytes.

Patent Literature 1 discloses a rectangular frame body having a rectangular window provided in the central part thereof, the frame body is horizontally long, and the ratio of the length of the long side to the length of the short side at the outer periphery of the frame body (long side/short side), i.e., the aspect ratio, exceeds 1. Patent Literature 1 also discloses that the frame body is formed of a pair of frame pieces each having a window, and the periphery and its vicinity of a bipolar plate are sandwiched between opening peripheries and their vicinities of the frame pieces, followed by fusion bonding to integrate the bipolar plate and the frame body with each other.

CITATION LIST

Patent Literature

PTL 1: Japanese Unexamined Patent Application Publication No. 2002-367658

SUMMARY OF INVENTION

A frame body for a redox flow battery according to an embodiment of the present invention is provided with a window, wherein the expressions A>C, B>D, and (B/A)≥0.2 are satisfied, where A represents the length of a long side of a rectangle that envelops the window, B represents the width of a horizontal frame of the frame body corresponding to the long side, C represents the length of a short side of the rectangle, and D represents the width of a vertical frame of the frame body corresponding to the short side.

A redox flow battery according to an embodiment of the present invention includes the frame body for a redox flow battery.

A redox flow battery according to an embodiment of the present invention includes a layered body in which the frame body for a redox flow battery and a bipolar plate disposed inside the window, a positive electrode, a membrane, and a negative electrode are stacked in this order a plurality of times, and the stacked state is maintained by fastening pressure applied in the stacking direction; and a positive electrode supply/drainage plate and a negative electrode supply/drainage plate which are stacked together with the layered body, wherein an outer periphery of the horizontal frame of the frame body in the layered body protrudes from an outer periphery of the positive electrode supply/drainage plate and an outer periphery of the negative electrode supply/drainage plate.

A cell stack according to an embodiment of the present invention includes the frame body for a redox flow battery.

A cell stack according to an embodiment of the present invention includes a layered body in which the frame body for a redox flow battery and a bipolar plate disposed inside the window, a positive electrode, a membrane, and a negative electrode are stacked in this order a plurality of times, and the stacked state is maintained by fastening pressure applied in the stacking direction; and a positive electrode supply/drainage plate and a negative electrode supply/drainage plate which are stacked together with the layered body, wherein an outer periphery of the horizontal frame of the frame body in the layered body protrudes from an outer periphery of the positive electrode supply/drainage plate and an outer periphery of the negative electrode supply/drainage plate.

DESCRIPTION OF EMBODIMENTS

[Problems to be Solved by the Present Disclosure]

It is desired that a frame body used for a redox flow battery (RF battery) be unlikely to deform under the pressure acting thereon. In particular, in the case where an RF battery is operated with a higher electrolyte flow rate, it is also desired that a frame body be unlikely to deform.

In a frame body having an aspect ratio exceeding 1, a long-side frame is longer than a short-side fame. Accordingly, even in the case where the frame width is the same over the entire periphery of a frame body, the long-side frame has lower rigidity than the short-side frame. Therefore, during operation of the RF battery, when electrolytes are circulated and fluid pressure acts on a frame body, a long-side frame is more likely to deform than a short-side frame. In the cases described below, a long-side frame is further more likely to deform. When the deformation of a frame body is large, there is a concern that the frame body may be damaged.

(a) In the case where a long-side frame is disposed so as to be orthogonal to the direction in which an electrolyte flows.

Since fluid pressure is likely to act in the flowing direction, the fluid pressure acting on the long-side frame increases.

(b) In the case where, during operation, the electrolyte flow rate is increased for the purpose of improving battery performance and the like.

In response to the increase in the electrolyte flow rate, the fluid pressure also increases.

(c) In the case where an RF battery is installed such that a long-side frame is disposed in the horizontal direction.

The electrolyte weight is likely to be applied to the long-side frame.

On the other hand, an acidic liquid, such as a sulfuric acid aqueous solution containing vanadium ions, is used as an electrolyte of an RF battery. The frame body is in contact with the acidic liquid and, therefore, is formed of a resin having excellent chemical resistance, such as vinyl chloride. Such a frame body formed of a resin does not have sufficient rigidity and can deform when stress, such as the fluid pressure, increases. If the electrolyte flow rate is decreased in order to prevent deformation of the frame body, it will not be possible to sufficiently meet demands for the increase in the electrolyte flow rate and the like.

Accordingly, an object of the present invention is to provide a frame body for a redox flow battery which is unlikely to deform. Another object of the present invention is to provide a redox flow battery and a cell stack, each including a frame body which is unlikely to deform.

[Advantageous effects of the Present Disclosure] A frame body for a redox flow battery according to an embodiment of the present invention is unlikely to deform.

In each of a redox flow battery according to an embodiment of the present invention and a cell stack according to an embodiment of the present invention, a frame body is unlikely to deform.

[Description of Embodiments of the Present Invention]

First, the contents of embodiments of the present invention will be enumerated and described below.

(1) A frame body for a redox flow battery according to an embodiment of the present invention is provided with a window, wherein the expressions A>C, B>D, and (B/A)≥0.2 are satisfied, where A represents the length of a long side of a rectangle that envelops the window, B represents the width of a horizontal frame of the frame body corresponding to the long side, C represents the length of a short side of the rectangle, and D represents the width of a vertical frame of the frame body corresponding to the short side.

The frame body for a redox flow battery and the window are each typically rectangular, but are not limited to being rectangular (refer to Modification Example (II) described later).

In accordance with the expression B>D, the outer periphery of the frame body for a redox flow battery and the opening periphery of the window are not similar to each other, even in the case where both are rectangular.

In accordance with the expression A>C, the window has a shape that is enveloped by a horizontally long rectangle in which the aspect ratio represented by the ratio of the length of the long side/the length of the short side (A/C) exceeds 1.

The frame body for a redox flow battery (RF battery) includes the horizontal frame corresponding to the long side of the horizontally long window and the vertical frame corresponding to the short side and, therefore, typically has a shape that is enveloped by a horizontally long rectangle or a vertically long rectangle in which the aspect ratio exceeds 1.

The rectangle that envelops the window corresponds to an opening periphery having a minimum perimeter among opening peripheries constituting the window. For example, in the case where the window is rectangular, a rectangle defined by an opening periphery constituting the window corresponds to the rectangle that envelops the window. In the case where the window has a shape other than a rectangle, the rectangle that envelops the window corresponds to the smallest rectangle that envelops an opening periphery constituting the window.

The width of the horizontal frame is defined as a maximum distance from the long side of the rectangle that envelops the window to the outer periphery of the horizontal frame. For example, in the case where the window is rectangular, the width of the horizontal frame corresponds to the maximum distance from the long side of the rectangle defined by the opening periphery to the outer periphery of the horizontal frame.

The width of the vertical frame is defined as a maximum distance from the short side of the rectangle that envelops the window to the outer periphery of the vertical frame. For example, in the case where the window is rectangular, the width of the vertical frame corresponds to the maximum distance from the short side of the rectangle defined by the opening periphery to the outer periphery of the vertical frame.

With respect to the horizontally long window, the width B of the horizontal frame is more than the width D of the vertical frame, and the ratio of the width B to the length A of the long side of the window is 0.2 or more. Thus, the horizontal frame is broad. In the frame body for an RF battery, since the horizontal frame is broad, for example, even when subjected to stress in a direction orthogonal to the longitudinal direction of the horizontal frame, the horizontal frame is unlikely to deform. In the case where such a frame body for an RF battery is used in an RF battery, even when the horizontal frame is disposed so as to be orthogonal to the direction in which an electrolyte flows, the electrolyte flow rate is increased during operation, or the RF battery is installed such that the horizontal frame is disposed in the horizontal direction (hereinafter, may be referred to as "horizontally installed"), the frame body for an RF battery is unlikely to deform. Therefore, the frame body for an RF battery can be used to construct an RF battery having excellent pressure resistance.

(2) As an example of the frame body for an RF battery, an embodiment in which the expression (D/C)≥0.2 is satisfied is preferable.

In the above-described embodiment, the ratio of the width D of the vertical frame to the length C of the short side is 0.2 or more. Thus, the vertical frame is broad. Therefore, even in the case where the absolute value of the length C of the short side is large, the vertical frame is unlikely to deform. In the above-described embodiment, both the horizontal frame and the vertical frame are unlikely to deform, and deformation is unlikely to occur as a whole.

(3) As an example of the frame body for an RF battery, an embodiment is preferable in which the frame body for a redox flow battery and the window are each rectangular, and the expression L>H is satisfied, where L represents the length of the long side including the horizontal frame in the frame body for a redox flow battery, and H represents the height of the short side including the vertical frame. In this embodiment, the horizontal frame has the width B that is uniform overall, and the vertical frame has the width D that is uniform overall.

In the above-described embodiment, in accordance with the expression L>H, the horizontally long, rectangular frame body, in which the aspect ratio represented by the length of the long side/the height of the short side (L/H) exceeds 1, is provided with the horizontally long, rectangular window. Therefore, in the above-described embodiment, although the horizontal frame has a shape that is likely to deform, since the width B of the horizontal frame is broad, deformation is unlikely to occur.

(4) As an example of the frame body for an RF battery, an embodiment is preferable in which the horizontal frame is provided with through holes into which fastening shafts are inserted. The fastening shafts typically extend through a plurality of stacked frame bodies and are used to maintain the stacked state.

The horizontal frame is broad and can have a sufficient area for forming through holes. When fastening shafts are disposed by insertion into a layered body in which frame bodies are stacked, the fastening shafts can be used as reinforcement members, and it is possible to enhance the rigidity of the horizontal frame. Furthermore, the displacement of the horizontal frame is regulated by the fastening shafts. For these reasons, in the above-described embodiment, deformation is more unlikely to occur. Furthermore, since the frame body is provided with through holes, the horizontal frame is provided with an area for forming through holes, and accordingly, it is not necessary to increase the size of end plates. Therefore, in the above-described embodiment, deformation is unlikely to occur, and it is possible to construct a small-size RF battery.

(5) A redox flow battery (RF battery) according to an embodiment of the present invention includes the frame body for a redox flow battery according to any one of items (1) to (4).

The RF battery includes the frame body for an RF battery which is unlikely to deform even when subjected to stress, such as fluid pressure. Therefore, in the RF battery, even when the horizontal frame is disposed so as to be orthogonal to the direction in which an electrolyte flows, the electrolyte flow rate is increased during operation, or the RF battery is horizontally installed, the frame body for an RF battery is unlikely to deform, and excellent pressure resistance is exhibited.

(6) A redox flow battery (RF battery) according to an embodiment of the present invention includes a layered body in which the frame body for a redox flow battery according to any one of items (1) to (4) and a bipolar plate disposed inside the window, a positive electrode, a membrane, and a negative electrode are stacked in this order a plurality of times; and the stacked state is maintained by fastening pressure applied in the stacking direction, and a positive electrode supply/drainage plate and a negative electrode supply/drainage plate which are stacked together with the layered body, wherein an outer periphery of the horizontal frame of the frame body in the layered body protrudes from an outer periphery of the positive electrode supply/drainage plate and an outer periphery of the negative electrode supply/drainage plate.

The layered body provided in the RF battery includes the frame body for an RF battery which is unlikely to deform even when subjected to stress, such as fluid pressure. Therefore, in the RF battery, even when the horizontal frame is disposed so as to be orthogonal to the direction in which an electrolyte flows, the electrolyte flow rate is increased during operation, or the RF battery is horizontally installed, the frame body for an RF battery is unlikely to deform, and excellent pressure resistance is exhibited. Furthermore, the positive electrode supply/drainage plate and the negative electrode supply/drainage plate provided in the RF battery are located inside the outer periphery of the broad horizontal frame, and thus, the RF battery is small-sized. Therefore, the RF battery is light compared with an RF battery which includes a positive electrode supply/drainage plate and a negative electrode supply/drainage, each having the same external dimensions as the frame body for an RF battery.

(7) A cell stack according to an embodiment of the present invention includes the frame body for a redox flow battery according to any one of items (1) to (4).

Since the cell stack includes the frame body for an RF battery which is unlikely to deform even when subjected to stress in a direction orthogonal to the longitudinal direction of the horizontal frame, it is possible to construct an RF battery having excellent pressure resistance.

(8) A cell stack according to an embodiment of the present invention includes a layered body in which the frame body for a redox flow battery according to any one of items (1) to (4) and a bipolar plate disposed inside the window, a positive electrode, a membrane, and a negative electrode are stacked in this order a plurality of times, and the stacked state is maintained by fastening pressure applied in the stacking direction; and a positive electrode supply/drainage plate and a negative electrode supply/drainage plate which are stacked together with the layered body, wherein an outer periphery of the horizontal frame of the frame body in the layered body protrudes from an outer periphery of the positive electrode supply/drainage plate and an outer periphery of the negative electrode supply/drainage plate.

Since the layered body provided in the cell stack includes the frame body for an RF battery which is unlikely to deform even when subjected to stress in a direction orthogonal to the longitudinal direction of the horizontal frame, it is possible to construct an RF battery having excellent pressure resistance. Furthermore, the positive electrode supply/drainage plate and the negative electrode supply/drainage plate provided in the cell stack are located inside the outer periphery of the broad horizontal frame, and thus, the cell stack is small-sized. Therefore, the cell stack can be used to construct a light RF battery compared with an RF battery which includes a positive electrode supply/drainage plate and a negative electrode supply/drainage, each having the same external dimensions as the frame body for an RF battery.

[Detailed Description of Embodiments of the Present Invention]

Specific examples of the embodiments of the present invention will be described below with reference to the drawings. In the drawings, the same reference signs denote the same components.

[Embodiment 1]

First, the overview of a redox flow battery (RF battery) 10 according to Embodiment 1 will be described, and then, each of the members will be described in detail.

Figure 3:
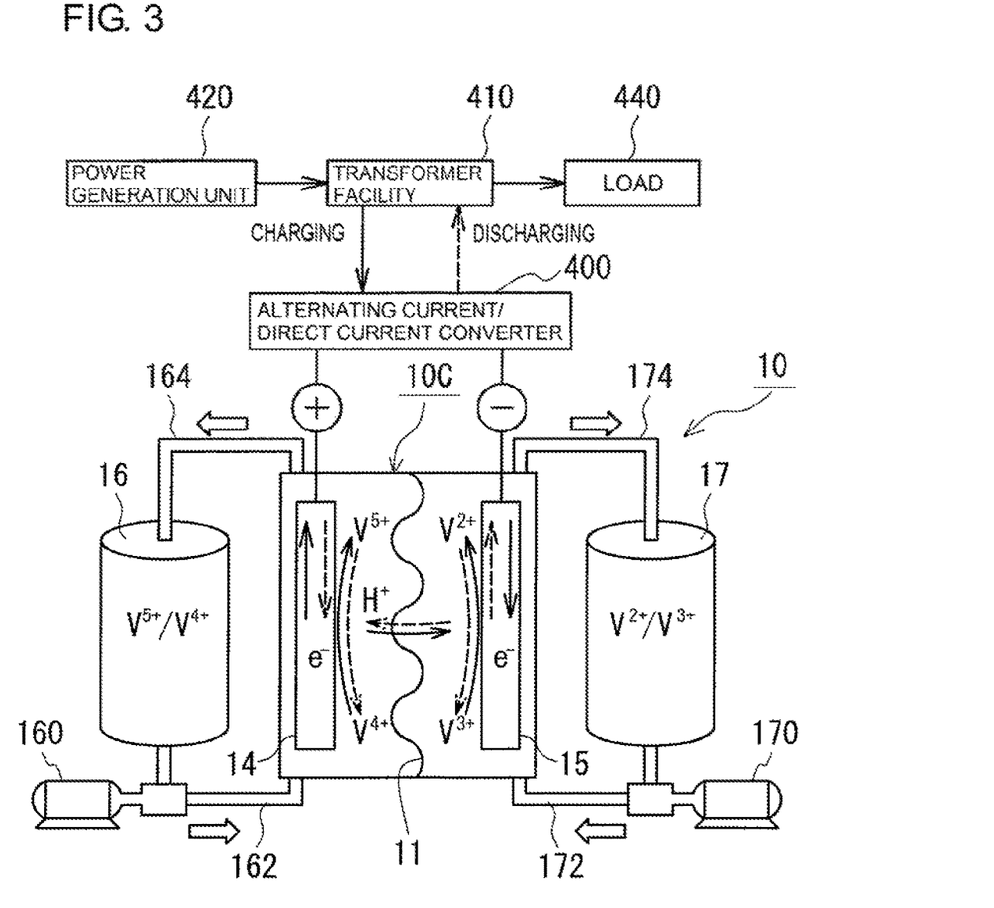
FIG. 3 is an operating principle diagram of a redox flow battery according to Embodiment 1.

In FIG. 3, ions shown inside a positive electrode tank 16 and a negative electrode tank 17 are examples of ion species contained in their respective electrode electrolytes. In FIG. 3, solid line arrows indicate charging, and dashed line arrows indicate discharging.

(Overview of RF Battery)

The RF battery 10 according to Embodiment 1 includes, as shown in FIG. 3, a battery cell 10C and a circulation mechanism that circulates and supplies electrolytes to the battery cell 10C. Typically, the RF battery 10 is connected, through an alternating current/direct current converter 400, a transformer facility 410, and the like, to a power generation unit 420 and a load 440 such as a power system or consumer, performs charging using the power generation unit 420 as a power supply source, and performs discharging to the load 440 as a power supply target. Examples of the power generation unit 420 include solar power generation apparatuses, wind power generation apparatuses, and other general power plants.

(Basic Configuration of RF Battery)

Battery cell

The battery cell 10C includes a positive electrode 14 to which a positive electrode electrolyte is supplied, a negative electrode 15 to which a negative electrode electrolyte is supplied, and a membrane 11 disposed between the positive electrode 14 and the negative electrode 15.

Each of the positive electrode 14 and the negative electrode 15 is a reaction site to which an electrolyte including an active material is supplied and in which the active material (ions) causes a battery reaction, and a porous body, such as a fiber aggregate of a carbon material, is used. Typically, the positive electrode 14 and the negative electrode 15 are rectangular (FIG. 2).

The membrane 11 is a member that separates the positive electrode 14 and the negative electrode 15 from each other and is also a member that allows specific ions to permeate therethrough. An ion-exchange membrane or the like is used.

Cell frame

Figure 2:
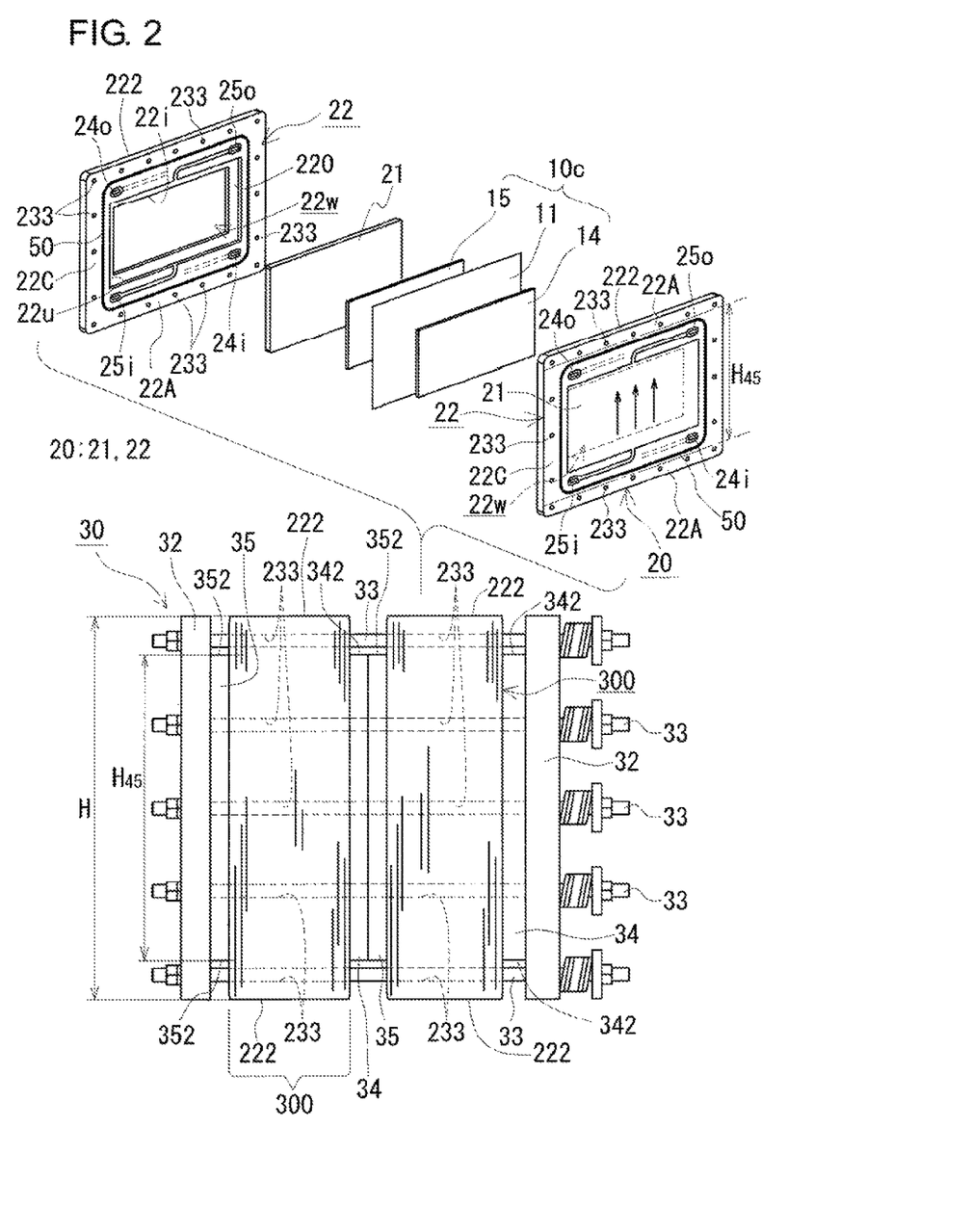
FIG. 2 includes an exploded perspective view schematically showing a battery cell provided with a frame body for a redox flow battery according to Embodiment 1 and a side view schematically showing a cell stack according to Embodiment 1 including the battery cell.

The battery cell 10C is constructed by using a cell frame 20 shown in FIG. 2.

The cell frame 20 includes a bipolar plate 21 and a frame body 22 provided on the periphery of the bipolar plate 21.

The bipolar plate 21 has a positive electrode 14 disposed on one surface thereof and a negative electrode 15 disposed on the other surface thereof and is a conductive member that conducts an electric current but does not allow electrolytes to flow therethrough. A conductive plastic plate containing graphite or the like and an organic material is used as the bipolar plate 21. The bipolar plate 21 is typically rectangular (FIG. 2).

The frame body 22 is provided with a window 22w. The bipolar plate 21, the positive electrode 14, and the negative electrode 15 are disposed inside the window 22w. The frame body 22 is an insulating member provided with supply passages for electrolytes to be supplied to the positive electrode 14 and the negative electrode 15 and drain passages for electrolytes discharged from the positive electrode 14 and the negative electrode 15. The supply passages include liquid supply holes 24i and 25i, slits extending from the liquid supply holes 24i and 25i to the window 22w, and the like. The drain passages include liquid drainage holes 24o and 25o, slits extending from the window 22w to the liquid drainage holes 24o and 25o, and the like.

Figure 1:
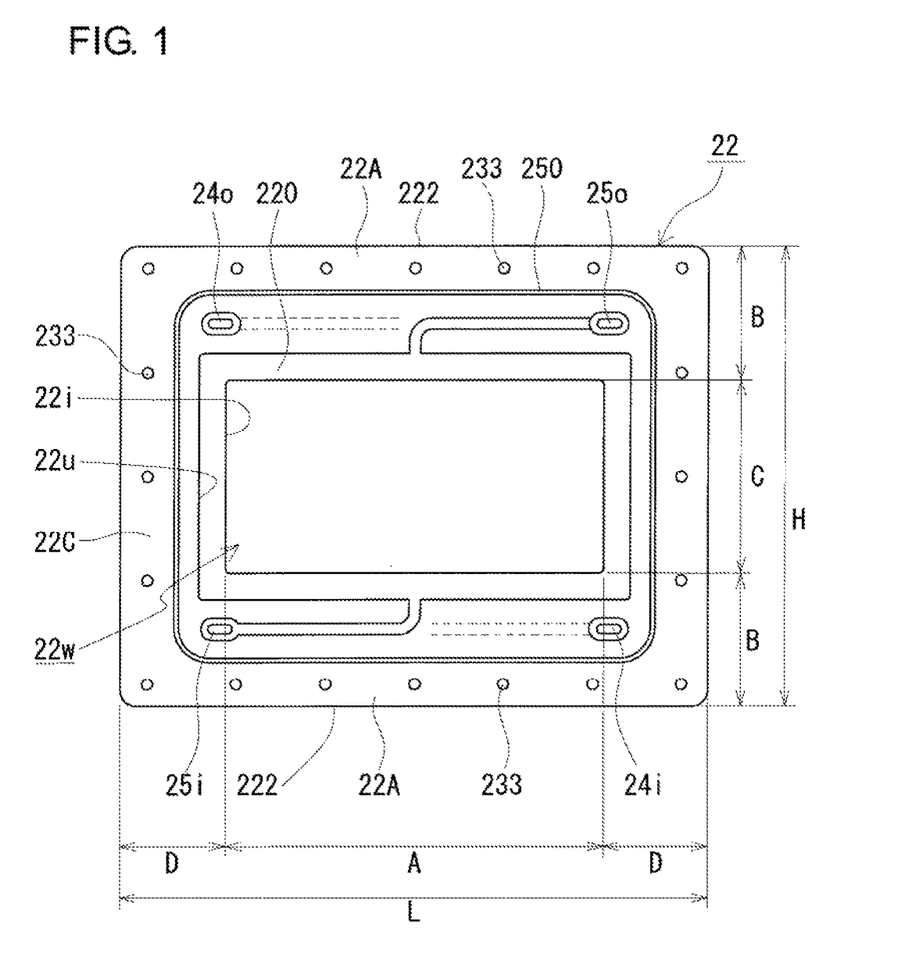
FIG. 1 is a schematic plan view showing a frame body for a redox flow battery according to Embodiment 1.

The frame body 22 of this example is provided with a sealing groove 250 (FIG. 1). The sealing groove 250 surrounds the window 22w and is provided outside the liquid supply holes 24i and 25i and the liquid drainage holes 24o and 25o. A sealing member 50 such as an 0 ring is fitted in the sealing groove 250 and interposed between adjacent frame bodies 22. FIG. 1 shows an example of a frame body 22 which surrounds a rectangular window 22w and is provided with a rectangular sealing groove 250 outside liquid supply holes 24i and 25i and liquid drainage holes 24o and 25o.

Cell stack

Although FIG. 3 shows a single-cell battery including a single battery cell 10C, the RF battery 10 according to this embodiment is a multi-cell battery including a plurality of battery cells 10C. In the multi-cell battery, a structure referred to as a cell stack 30 shown in FIG. 2 is used.

The cell stack 30, typically, includes a layered body in which a cell frame 20 including a frame body 22 and a bipolar plate 21, a positive electrode 14, a membrane 11, and a negative electrode 15 are stacked in this order a plurality of times, a positive electrode supply/drainage plate 34, a negative electrode supply/drainage plate 35, a pair of end plates 32 disposed at ends of the layered body, and fastening members that extend between the end plates 32, examples thereof including fastening shafts 33, such as long bolts, and nuts. The positive electrode supply/drainage plate 34 and the negative electrode supply/drainage plate 35 are stacked so as to sandwich the layered body, the end plates 32 are disposed so as to sandwich the resulting stacked body, and integration is performed with the fastening members.

The positive electrode supply/drainage plate 34 and the negative electrode supply/drainage plate 35 are connected to their respective electrolyte flow ducts formed by liquid supply holes 24i and 25i and liquid drainage holes 24o and 25o of a plurality of stacked cell frames 20.

The positive electrode supply/drainage plate 34 supplies a positive electrode electrolyte to the positive electrode 14 and discharges the positive electrode electrolyte from the positive electrode 14.

The negative electrode supply/drainage plate 35 supplies a negative electrode electrolyte to the negative electrode 15 and discharges the negative electrode electrolyte from the negative electrode 15.

When the end plates 32 are fastened with the fastening members, the stacked state of the layered body is maintained by the fastening pressure acting in the stacking direction. The fastening force in the stacking direction presses the sealing member 50 disposed between the frame bodies 22 and the space between the frame bodies 22 is maintained in a fluid-tight manner.

The cell stack 30 may be used, as shown in FIG. 2, such that a certain number of battery cells 10C constitute a sub-cell stack 300 and a plurality of (two in FIG. 2) sub-cell stacks 300 are stacked. Typically, each sub-cell stack 300 is provided with a positive electrode supply/drainage plate 34 and a negative electrode supply/drainage plate 35.

Regarding cell frames located at both ends in the stacking direction of battery cells 10C in a sub-cell stack 300 or cell stack 30, cell frames in each of which, instead of a bipolar plate 21, a current collector plate (not shown) is disposed are used.

Circulation Mechanism

The circulation mechanism includes, as shown in FIG. 3, a positive electrode tank 16 which stores a positive electrode electrolyte to be circulated and supplied to the positive electrode 14, a negative electrode tank 17 which stores a negative electrode electrolyte to be circulated and supplied to the negative electrode 15, pipes 162 and 164 which connect the positive electrode tank 16 and the battery cell 10C (cell stack 30), pipes 172 and 174 which connect between the negative electrode tank 17 and the battery cell 10C (cell stack 30), and pumps 160 and 170 provided, respectively, on the pipes 162 and 172 on the supply side to the battery cell 10C. The pipes 162 and 164 are connected to the positive electrode supply/drainage plate 34, and the pipes 172 and 174 are connected to the negative electrode supply/drainage plate 35.

Regarding the basic configuration, materials, electrolytes, and the like of the RF battery 10, a known configuration, materials, electrolytes, and the like can be appropriately used.

The RF battery 10 according to Embodiment 1 and the cell stack 30 according to Embodiment 1 are each characterized by including a frame body 22 having a specific shape according to Embodiment 1. Specifically, the window 22w provided in the frame body 22 has a shape that is enveloped by a horizontally long or vertically long rectangle. In this example, the window 22w is, as shown in FIG. 1, horizontally long, rectangular. In the frame body 22, the ratio of the length of the long side in the window 22w to the width of a horizontal frame 22A corresponding to the long side satisfies a specific range.

Specifically, as shown in FIG. 1, the frame body 22 has a shape in which the expressions A>C, B>D, and (B/A)≥0.2 are satisfied, where A represents the length of a long side of a rectangle that envelops the window 22w, B represents the width of a horizontal frame 22A corresponding to the long side, C represents the length of a short side of the rectangle, and D represents the width of a vertical frame 22C corresponding to the short side. The frame body 22 of this example has a rectangular shape, in which the horizontal frame 22A has the width B that is uniform overall, the vertical frame 22C has the width D that is uniform overall, and a corner portion that connects the horizontal frame 22A and the vertical frame 22C is rectangular with the length B x the length D.

The frame body 22 according to Embodiment 1 will be described in detail mainly with reference to FIG. 1.

(Frame Body)

The frame body 22 of this example has a window 22w in the central part thereof, the window 22w passing through the frame body 22 from the front surface to the back surface thereof. In this example, by fitting a bipolar plate 21 in the window 22w, a cell frame 20 (refer to the frame body 22 on the right side of FIG. 2) is constituted. The close contact state between the bipolar plate 21 and the frame body 22 is maintained by the fastening force described above.

The frame body 22 is formed so as to be able to support the bipolar plate 21. Specifically, the portion of the frame body 22 in which the window 22w is formed has a difference in level, in which one surface (the front side surface in FIG. 1; the right surface in FIG. 2) is at the higher level than the other surface. An opening periphery (upper periphery 22u) on the higher-level side of the window 22w is rectangular corresponding to the rectangular bipolar plate 21. An opening periphery (innermost periphery 22i) of a lower-level portion 220 of this example has a rectangular shape that is smaller than the maximum external form of the bipolar plate 21. The lower-level portion 220 in the form of a rectangular frame supports the periphery of the bipolar plate 21 fitted in the window 22w.

Since there is a difference in level as described above, the perimeter of the upper periphery 22u provided on one surface of the frame body 22 is different from the perimeter of the innermost periphery 22i provided on the other surface. The perimeter of the innermost periphery 22i is shorter.

In this example, since the window 22w is rectangular, the length A of a long side of a rectangle that envelops the window 22w and the length C of a short side of the rectangle, respectively, correspond to the length of the long side and the length of the short side of a rectangle formed by the innermost periphery 22i among opening peripheries constituting the window 22w.

The horizontal frame 22A is a rectangular region having the long side of the innermost periphery 22i as a side, and the width B thereof corresponds to a distance from the long side of the innermost periphery 22i to an outer periphery 222 of the horizontal frame 22A.

The vertical frame 22C is a rectangular region having the short side of the innermost periphery 22i as a side, and the width D thereof corresponds to a distance from the short side of the innermost periphery 22i to an outer periphery of the vertical frame 22C.

Furthermore, in the frame body 22 of this example, when the length of the long side including the horizontal frame 22A is represented by L (=A+2D), and the height of the short side including the vertical frame 22C is represented by H (=C+2B), the length L is more than the height H (L>H). Consequently, the frame body 22 of this example satisfies the expression (width B of horizontal frame 22A)>(width D of vertical frame 22C), and has a horizontally long, rectangular shape in which the aspect ratio (length L/height H) exceeds 1.

Horizontal Frame

The frame body 22 satisfies the requirement that the ratio of (the width B of the horizontal frame 22A)/(the length A of the long side of the window 22w) is 0.2 or more. Qualitatively, the horizontal frame 22A is broad relative to the long side of the horizontally long window 22w. In the frame body 22 that satisfies the expression (B/A)≥0.2, the displacement of the horizontal frame 22A is small and deformation is unlikely to occur compared with a frame body in which (B/A) is less than 0.2, in particular, even when subjected to stress in a direction orthogonal to the longitudinal direction of the horizontal frame 22A (in the upward/downward direction in FIG. 1). The reason for this will be described below by considering that the displacement of the frame body 22 is equivalent to the amount of deflection σ of a beam fixed at both ends under uniformly distributed load.

In accordance with the beam deflection formula, $$\text{Amount of deflection } \sigma = (w \times l^4)/(384 \times E \times I),$$

where w is the distributed load, l is the length of the beam, E is the Young's modulus of the beam, and I is the geometrical moment of inertia.

The geometrical moment of inertia I can be written as $I=(b \times h^3)/12$, where b is the width of the beam, and h is the height of the beam.

When the "distributed load w" is read as "stress acting on the frame body 22", the "length l of the beam" is read as "length A of the long side of the window 22w", the "Young's modulus E of the beam" is read as "Young's modulus of the constituent material of the frame body 22", the "width b of the beam" is read as "thickness of the frame body 22", and the "height h of the beam" is read as "width B of the horizontal frame of the frame body 22" and when the formula representing the geometrical moment of inertia is substituted into the beam deflection formula, the displacement (amount of deflection σ) of the frame body 22 is inversely proportional to the cube of the width B of the horizontal frame 22A.

For example, consideration will be given to an existing rectangular frame body (hereinafter, referred to as the "existing frame body") shown below. In the case where the length A of the long side of the window is 900 mm and the width B of the horizontal frame is 100 mm, the (B/A) value of the existing frame body is 100/900, i.e., 0.11.

The amount of deflection when the (B/A) value is set to be 0.2 is less than 20% (about 17%) relative to the amount of deflection of the existing frame body.

Therefore, in the frame body 22 according to Embodiment 1, even when subjected to stress in a direction orthogonal to the longitudinal direction of the horizontal frame 22A, the displacement of the horizontal frame 22A is small and deformation is unlikely to occur compared with the existing frame body.

Next, the reason for adjusting the width B of the horizontal frame 22A will be described.

The bending moment M of a beam can be written by using the distributed load w and the length l of the beam, as $$M=(w \times l^2)/12.$$

When the "length l of the beam" is read as "length A of the long side of the window 22*w*" or "length C of the short side of the window 22*w*", A>C, and therefore, the bending moment of the horizontal frame 22A is larger than that of the vertical frame 22C. Consequently, the horizontal frame 22A corresponding to the long side of the widow 22*w* is more likely to deform toward the outside of the frame body 22 than the vertical frame 22C corresponding to the short side.

As the (B/A) value increases, the displacement of the horizontal frame 22A is smaller and deformation is more unlikely to occur even when subjected the stress. In particular, when the (B/A) value is 0.24 or more, 0.3 or more, 0.33 or more, or 0.35 or more, the horizontal frame 22A is unlikely to deform even when the absolute value of the length A is large. When the (B/A) value is excessively large, the frame body 22 is excessively large, resulting in an increase in the size of the RF battery 10. From the viewpoint of decreasing the size of the RF battery 10, the (B/A) value is preferably 0.45 or less, 0.4 or less, or 0.38 or less. In accordance with the beam deflection formula, the displacement (amount of deflection) of the horizontal frame 22A increases in proportion to the fourth power of the absolute value of the length A. Therefore, in the case where the absolute value of the length A is 500 mm or more, 600 mm or more, or 700 mm or more, the expression (B/A)≥0.2 is preferably satisfied.

Regarding a frame body in which the expression (B/A)≥0.2 is not satisfied, i.e., a frame body in which (B/A)<0.2, when the width of the horizontal frame is increased by 1.25 times or more, in accordance with the beam deflection formula, the displacement of the frame body is decreased to about ½ or less, and the deformation of the horizontal frame can be reduced to about half or less. By changing the size in such a manner, the deformation of the horizontal frame can be sufficiently reduced. For example, regarding the existing frame body in which the length A of the long side of the window is 900 mm and the width B of the horizontal frame is 100 mm, by setting the width B of the horizontal frame to be 125 mm or more, the displacement of the horizontal frame can be decreased to about ½ or less of that of the existing frame body. Furthermore, when the width B of the horizontal frame is set to be 180 mm or more and the expression (B/A)≥0.2 is satisfied, the displacement of the horizontal frame can be decreased to less than ⅕ of that of the existing frame body.

Vertical Frame

Furthermore, the frame body 22 of this example satisfies the requirement that the ratio of (the width D of the vertical frame 22C/the length C of the short side of the window 22*w*) is 0.2 or more ((D/C)≥0.2). Qualitatively, the vertical frame 22C is broad relative to the short side of the window 22*w*.

The length C of the vertical frame 22C is smaller than the length A of the horizontal frame 22A (A>C), and as described above, the vertical frame 22C is more unlikely to deform than the horizontal frame 22A. However, in accordance with the formula representing the bending moment, when the absolute value of the length C increases, the vertical frame 22C also becomes likely to deform. In the frame body 22 that satisfies the expression (D/C)≥0.2, the displacement of the vertical frame 22C is small and deformation is unlikely to occur compared with a frame body in which (D/C) is less than 0.2, in particular, even when subjected to stress in a direction orthogonal to the longitudinal direction of the vertical frame 22C (in the leftward/rightward direction in FIG. 1). Since the expression (D/C) ≥0.2 is satisfied, even when the absolute value of the length C is large, the vertical frame 22C is unlikely to deform. Regarding the reason for limiting the upper limit 0.2, refer to the above-described description on (B/A). Furthermore, in accordance with the beam deflection formula, in the case where the absolute value of the length C is 200 mm or more, 250 mm or more, or 300 mm or more, the expression (D/C)≥0.2 is preferably satisfied.

As the (D/C) value increases, the displacement of the vertical frame 22C is smaller and deformation is more unlikely to occur even when subjected the stress. When the (D/C) value is 0.25 or more, 0.3 or more, 0.35 or more, 0.4 or more, or 0.5 or more, the vertical frame 22C is unlikely to deform even when the absolute value of the length C is large. An excessively large (D/C) value results in an increase in the size of the RF battery 10 as described above. Therefore, the (D/C) value is preferably 0.6 or less, 0.57 or less, or 0.53 or less.

Other Configuration

Furthermore, the frame body 22 of this example includes through holes 233 into which fastening shafts 33 are inserted. In this example, in addition to the horizontal frame 22A, the vertical frame 22C is also provided with a plurality of through holes 233. Furthermore, corner portions of the frame body 22 are each provided with a through hole 233.

The number, arrangement position, size, shape, and the like of the through holes 233 can be appropriately selected.

As the number of through holes 233 increases, the horizontal frame 22A and the vertical frame 22C are reinforced by the fastening shafts 33 disposed by insertion into the through holes 233, and outward displacement of the horizontal frame 22A and the vertical frame 22C is regulated by the fastening shafts 33. Accordingly, the frame body 22 becomes unlikely to deform, which is preferable.

The through holes 233 can be uniformly arranged with respect to each of the horizontal frame 22A and the vertical frame 22C. Alternatively, by providing a larger number of through holes 233 in a portion which is more likely to deform (e.g., a central part in the longitudinal direction) in each of the horizontal frame 22A and the vertical frame 22C, rigidity can be locally enhanced.

Alternatively, a larger through hole 233 may be provided in the portion which is more likely to deform so that a thicker fastening shaft 33 can be disposed by insertion.

In the case where a plurality of through holes 233 are provided, they can have different shapes and sizes. The through holes 233 in the horizontal frame 22A can have a different shape, size, or number of through holes from the through holes 233 in the vertical frame 22C.

The shape of the through hole 233 is selected according to the corresponding fastening shaft 33. Although the through holes 233 are circular holes corresponding to round bar-shaped fastening shafts 33 in FIGS. 1 and 2, the shape of the through holes can be appropriately changed to polygonal, such as tetragonal or hexagonal, or elliptical.

The through holes 233 are provided in a region closer to the outer periphery of the frame body 22 than the location where the sealing groove 250 is formed. In the RF battery 10 or cell stack 30 including the frame body 22, a region inside the sealing member 50 disposed in the sealing groove 250 corresponds to a region filled with an electrolyte. By providing the through holes 233 in the region closer to the outer periphery, the fastening shafts 33 disposed by insertion into the through holes 233 do not substantially come into contact with the electrolyte. Therefore, even if the fastening shafts 33 are made of metal that can be dissolved in an acidic electrolyte, they can be used.

Thickness

As the thickness of the frame body 22 is increased, rigidity is enhanced and deformation is unlikely to occur (refer to the "width b of the beam" in the formula representing the geometrical moment of inertia described above). However, when the thickness is excessively large, the size of the frame body 22 increases, resulting in an increase in the size of the RF battery 10. Furthermore, the thickness of the frame body 22 regulates the total thickness of the positive electrode 14, the bipolar plate 21, and the negative electrode 15 in the state in which the fastening force is applied to the layered body. Therefore, it is preferable to select the thickness of the frame body 22 such that the total thickness of the three components satisfies a predetermined value and an increase in the size is not caused.

Constituent Material

As the constituent material for the frame body 22, a material that has excellent insulating properties, does not react with an electrolyte, and has electrolyte resistance (chemical resistance, acid resistance, and the like) can be suitably used. Furthermore, when the constituent material has moderate rigidity, a frame body 22 that is unlikely to deform can be obtained. Specific preferred examples of the constituent material include vinyl chloride, polyethylene, polypropylene, and the like.

(Bipolar Plate)

The bipolar plate 21 of this example is a planar member, and the periphery thereof is placed at the lower-level portion 220 of the window 22w. By interposing a sealing member (not shown) between the bipolar plate 21 and the lower-level portion 220, the space between one surface side and the other surface side of the bipolar plate 21 can be maintained in a fluid-tight manner.

The constituent material for the bipolar plate 21 is as described above. The thickness of the bipolar plate 21 can be appropriately selected. As the thickness of the bipolar plate 21 is increased, excellent rigidity and strength can be exhibited. As the thickness of the bipolar plate 21 is decreased, the thickness of the frame body 22 can be decreased, and thereby, the size of the layered body can be decreased.

(Supply/Drainage Plate)

The positive electrode supply/drainage plate 34 and the negative electrode supply/drainage plate 35 provided in the RF battery 10 and the cell stack 30 of this example are, as shown in FIG. 2, smaller than the frame body 22 and have an external form that is different from the external form of the frame body 22.

In accordance with an existing art, a positive electrode supply/drainage plate 34 and a negative electrode supply/drainage plate 35 each are assumed to have the same external form and size as those of a frame body 22. The frame body 22 according to Embodiment 1 is broad and relatively large as described above. Therefore, if the external form of each of the positive electrode supply/drainage plate 34 and the negative electrode supply/drainage plate 35 is increased so as to correspond to the external form of the frame body 22, the size and weight of each of the RF battery 10 and the cell stack 30 will increase. Accordingly, the positive electrode supply/drainage plate 34 and the negative electrode supply/drainage plate 35 of this example each have a form and size such that the outer periphery 222 of the horizontal frame 22A in the layered body protrudes from the outer periphery 342 of the positive electrode supply/drainage plate 34 and the outer periphery 352 of the negative electrode supply/drainage plate 35.

The positive electrode supply/drainage plate 34 and the negative electrode supply/drainage plate 35 of this example are each horizontally long, rectangular with the same length as the length L of the frame body 22 and a height $H_{45}$ that is smaller than the height H of the frame body 22. The height $H_{45}$ is provided such that, when the positive electrode supply/drainage plate 34 and the negative electrode supply/drainage plate 35 are stacked with the layered body, the outer peripheries 342 and 352 are located inside the outer periphery 222 of the horizontal frame 22A of the frame body 22 in the layered body. In this example, the outer peripheries 342 and 352 are located on the inner side of the through holes 233 provided in the horizontal frames 22A of the frame body 22 constituting the layered body and on the outer side of the sealing member 50 on the frame body 22. Accordingly, in the cell stack 30 shown in FIG. 2, fastening shafts 33 disposed on the long-side sides of the frame body 22 are arranged on the upper and lower sides the positive electrode supply/drainage plate 34 and the negative electrode supply/drainage plate 35. The portions in which the positive electrode supply/drainage plate 34 and the negative electrode supply/drainage plate 35 are arranged are locally recessed.

Furthermore, when the positive electrode supply/drainage plate 34 and the negative electrode supply/drainage plate 35 are stacked with the layered body, a region on the short-side side of each of the positive electrode supply/drainage plate 34 and the negative electrode supply/drainage plate 35 is substantially flush with a region on the short-side side of the frame body 22. Accordingly, the positive electrode supply/drainage plate 34 and the negative electrode supply/drainage plate 35 each have through holes at positions overlapping the through holes 233 of the frame body 22 in the short-side region. Since the fastening shafts 33 are disposed by insertion into the through holes, the positive electrode supply/drainage plate 34 and the negative electrode supply/drainage plate 35 are aligned with respect to the layered body, and misalignment is unlikely to occur.

(Advantages)

In the frame body 22 according to Embodiment 1, the ratio of the width B of the horizontal frame 22A corresponding to the long side of the horizontally long window 22w to the length A of the long side of the window 22w is 0.2 or more, and thus, the horizontal frame 22A is broad. Accordingly, even when subjected to stress in a direction orthogonal to the longitudinal direction of the horizontal frame 22A, for example, stress that stretches the long side of the window 22w outward, the horizontal frame 22A is unlikely to deform. In this example, in spite of the fact that the frame body 22 is also horizontally long, rectangular and the horizontal frame 22A is likely to deform compared with the vertical frame 22C, the horizontal frame 22A is unlikely to deform.

In particular, in the frame body 22 of this example, the ratio of the width D of the vertical frame 22C to the length C of the short side of the window 22w is 0.2 or more, and thus, the vertical frame 22C is broad. Accordingly, the vertical frame 22C is also unlikely to deform. Therefore, the frame body 22, as a whole, is unlikely to deform.

Furthermore, in the frame body 22 of this example, through holes 233 for fastening shafts 33 are provided in the horizontal frame 22A, and fastening shafts 33 are disposed by insertion. This provides reinforcement and regulates outward displacement. For this reason, deformation is also unlikely to occur. In this example, not only the horizontal frame 22A, but also the vertical frame 22C is provided with through holes 233. The frame body 22, as a whole, is reinforced with the fastening shafts 33, and outward displacement is regulated. Therefore, deformation is more unlikely to occur.

In the RF battery 10 according to Embodiment 1 including the frame body 22 according to Embodiment 1 which is unlikely to deform, even when subjected to stress, such as fluid pressure due to electrolyte flow during operation, the frame body 22 is unlikely to deform, and excellent pressure resistance is exhibited. Furthermore, in the RF battery 10 according to Embodiment 1, even when the frame body 22 is disposed such that the horizontal frame 22A is orthogonal to the direction in which an electrolyte flows, or the RF battery 10 is horizontally installed, the frame body 22 is unlikely to deform. The cell stack 30 according to Embodiment 1 can be used to construct an RF battery 10 in which the frame body 22 is unlikely to deform as described above.

In addition, although each of the RF battery 10 and the cell stack 30 of this example includes a layered body including relatively large frame bodies 22, weight reduction can be achieved by forming the positive electrode supply/drainage plate 34 and the negative electrode supply/drainage plate 35 so as to be smaller than the layered body.

[Modification Examples]

At least one of the following changes can be made to Embodiment 1:

(I) The expression (D/C)<0.2 is satisfied.

(II) The frame body 22 and the window 22w are formed into a shape other than a rectangle.

The shape may be, for example, a rectangle with rounded corner portions, a racetrack shape formed by combining a rectangle with semicircular arcs, or an ellipse, and preferably, the expression: the length A of the long side of a rectangle that envelops the shape>the length C of the short side of the rectangle is satisfied.

(III) The horizontal frame 22A only or the vertical frame 22C only is provided with through holes 233.

When the horizontal frame 22A which is likely to deform is provided with through holes 233, the horizontal frame 22A is unlikely to deform as described above, which is preferable.

(IV) The through holes 233 are omitted.

(V) The length of each of the positive electrode supply/drainage plate 34 and the negative electrode supply/drainage plate 35 is set to be smaller than the length L of the frame body 22, and through holes of the positive electrode supply/drainage plate 34 and the negative electrode supply/drainage plate 35 are omitted.

For example, when a positive electrode supply/drainage plate 34 and a negative electrode supply/drainage plate 35 are stacked on a layered body, the length of each of the positive electrode supply/drainage plate 34 and the negative electrode supply/drainage plate 35 may be adjusted such that the outer peripheries on the short-side side of the positive electrode supply/drainage plate 34 and the negative electrode supply/drainage plate 35 are located on the inner side of through holes 233 provided in vertical frames 22C and on the outer side of the sealing member 50 on the frame body 22.

(VI) The frame body 22 includes a pair of frame pieces each having a window, and the periphery of a bipolar plate 21 is sandwiched between opening peripheries and their vicinities of the frame pieces. This form is maintained by the fastening force as in Embodiment 1. A recess into which the periphery of the bipolar plate 21 is fitted can be provided in the vicinity of the opening periphery within the surface for sandwiching the bipolar plate 21 in each frame piece.

The present invention is not limited to the examples shown above, but is defined by appended claims, and is intended to include all modifications within the meaning and scope equivalent to those of the claims.

The invention claimed is:

1. A frame body for a redox flow battery comprising a window,
    wherein the expressions A>C, B>D, and (B/A)≥0.2 are satisfied, where A represents the length of a long side of a rectangle that envelops the window, B represents the width of a horizontal frame of the frame body corresponding to the long side, C represents the length of a short side of the rectangle, and D represents the width of a vertical frame of the frame body corresponding to the short side,
    wherein the expression (D/C)≥0.2 is satisfied.

2. The frame body for a redox flow battery according to claim 1, wherein the frame body for a redox flow battery and the window are each rectangular, and the expression L>H is satisfied, where L represents the length of the long side including the horizontal frame in the frame body for a redox flow battery, and H represents the height of the short side including the vertical frame.

3. The frame body for a redox flow battery according to claim 1, wherein the horizontal frame is provided with through holes into which fastening shafts are inserted.

4. A redox flow battery comprising the frame body for a redox flow battery according to claim 1.

5. A redox flow battery comprising:
    a layered body in which the frame body for a redox flow battery according to claim 1 and a bipolar plate disposed inside the window, a positive electrode, a membrane, and a negative electrode are stacked in this order a plurality of times, and the stacked state is maintained by fastening pressure applied in the stacking direction; and a positive electrode supply/drainage plate and a negative electrode supply/drainage plate which are stacked together with the layered body, wherein an outer periphery of the horizontal frame of the frame body in the layered body protrudes from an outer periphery of the positive electrode supply/drainage plate and an outer periphery of the negative electrode supply/drainage plate.

6. A cell stack comprising the frame body for a redox flow battery according to claim 1.

7. A cell stack comprising:

a layered body in which the frame body for a redox flow battery according to claim 1 and a bipolar plate disposed inside the window, a positive electrode, a membrane, and a negative electrode are stacked in this order a plurality of times, and the stacked state is maintained by fastening pressure applied in the stacking direction; and a positive electrode supply/drainage plate and a negative electrode supply/drainage plate which are stacked together with the layered body, wherein an outer periphery of the horizontal frame of the frame body in the layered body protrudes from an outer periphery of the positive electrode supply/drainage plate and an outer periphery of the negative electrode supply/drainage plate.

* * * * *